3,007,912
CHROMIUM-CONTAINING AZO DYESTUFFS
Fabio Beffa and Guido Schetty, Basel, Switzerland, assignors to J. R. Geigy A.-G., Basel, Switzerland
No Drawing. Filed Apr. 13, 1960, Ser. No. 21,871
Claims priority, application Switzerland Apr. 15, 1959
6 Claims. (Cl. 260—145)

The present invention concerns chromium-containing azo dyestuffs, a process for the production thereof and their use for the dyeing and printing of material containing polypeptide groups. The invention also concerns, as industrial products, the materials fast dyed with these new dyestuffs.

It has been found that blue to blue-grey azo dyestuffs are obtained if one of the monoazo dyestuffs of the Formula I

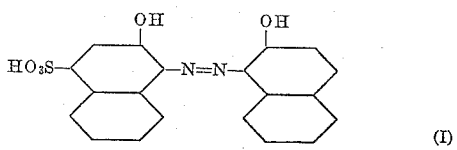

(I)

or an unsulphonated metallisable monoazo dyestuff of the general formula II

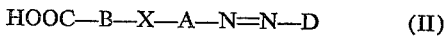

(II)

wherein

A represents a possibly further substituted hydroxyphenyl radical containing the hydroxyl group in o-position to the linkage with the azo group,
X represents a divalent bridging member containing oxygen,
B represents a possibly further substituted aryl radical of the benzene and naphthalene series, and
D represents a halogenated 1-hydroxy-2-naphthyl radical, is converted into the chromium compound which contains 1 molecule of dyestuff to 1 atom chromium, and then 1 molecule of the other, metal-free monoazo dyestuff is added thereto.

Complex chromium compounds containing a whole chromium atom to one dyestuff molecule as used according to the invention are obtained from the corresponding metal-free monoazo dyestuffs by treating with an agent giving off an excess of chromium. This treatment is performed advantageously in an acid medium at temperatures of about 80–150°, if necessary under pressure. In the most simple cases, the chroming is performed in aqueous solution or suspension, but often the addition of organic solvents or the performance of the reaction in such, such as in alcohols, formamide or acetamide, is indicated. If necessary the reaction can also be performed in an organic melt, for example in that of an alkali metal salt of a low aliphatic monocarboxylic acid such as, e.g. sodium acetate. Chromic salts such as, e.g. chromic chloride, chromic fluoride, chromic sulphate, chromic acetate and chromium formate are used principally as agents giving off chromium but also complex chromium compounds or salts of hexavalent chromium can be used such as, e.g. alkali bichromates. On using the latter however, the presence of a reducing agent such as, e.g. a reducing sugar is indicated.

As such complex chromium compound which contains 1 chromium atom per dyestuff molecule, in particular that of the monoazo dyestuff containing sulphonic acid groups of the Formula I is easily obtainable as a homogeneous compound. Thus, in the process according to the invention, this is the preferred so-called 1:1 chromium complex component to which a metal-free monoazo dyestuf of the general Formula II containing carboxylic acid groups is added.

The coupling products containing no sulphonic acid groups of o-hydroxydiazobenzene compounds containing an aryl radical having carboxyl groups, which radical is bound to the benzene nucleus by way of a bridging member containing oxygen, with halogenated 1-hydroxynaphthalenes which can be coupled in the o-position to the hydroxyl group are used as monoazo dyestuffs of the Formula II. Mainly carbonyl, carbonylamino, sulphonyl and sulphonylamino groups are used as bridging members containing oxygen. Thus, diazo components for the monoazo dyestuffs used according to the invention of the Formula II are, for example, those obtained from 4-hydroxy-3-nitrobenzoic acid halides by condensation with aminobenzoic acids or aminonaphthalene carboxylic acids, reduction and diazotisation of the 4-hydroxy-3-diazobenzene-1-carboxylic acid carboxyarylamides obtained. Another group are the sulphonic acid carboxyarylamides corresponding to the previous compounds. These are obtained, for example, from 4-chloro-3-nitrobenzene sulphonic acid halides by reacting with aminoaryl carboxylic acids, exchanging the chlorine atom for the hydroxyl group, reducing the 4-hydroxy-3-nitrobenzene sulphonic acid carboxyarylamides obtained to the corresponding amines and then diazotising them. Other diazo components which can also be used are the diazonium compounds of 2-(3'-amino-4'-hydroxybenzoyl)-benzoic acid and 4-hydroxy-3-aminodiphenyl sulphone - 3'-carboxylic acid and, finally, also derivatives of these compounds which are further substituted as defined. The non-ionogenic substituents usual in azo dyestuffs are used as further substituents, thus, for example, halogen, alkyl, alkoxy, acyl, acylamino, nitro and cyano groups.

Halogenated 1-hydroxynaphthalenes which couple in the o-position to the hydroxyl group and which, together with the diazo components defined above, form the dyestuffs of the general Formula II are, for example, 4-chloro-1-hydroxynaphthalene, 5-chloro - 1 - hydroxynaphthalene, 5.8-dichloro-1-hydroxynaphthalene and 5.8.X-trichloro-1-hydroxynaphthalene.

Preferred monoazo dyestuffs of the general Formula II contain the carboxyl group present as defined bound at a phenylsulphamyl radical. In this connection, it is of advantage to the properties of the end products if the carboxyl group in these radicals is always bound in o-position to the amide nitrogen atom. In these dyestuffs the bridging member X of the Formula II is the group —SO₂—NH—. In addition, particularly valuable dyestuffs are produced according to the invention if, as monoazo dyestuffs of the general Formula II, the coupling products of the preferred diazo compounds mentioned above are used with di- or tri-chloro-1-hydroxynaphthalene compounds.

The addition of the 1:1 chromium complex compounds to the metal-free dyestuffs is performed by heating 1 mol of both components in an aqueous solution or suspension in the presence of an acid binding agent at medium temperatures of, for example, 40 to 95° C. Often the presence of an organic polar solvent such as, e.g. alcohol, glycol monomethyl ether or monoethyl ether is of advantage. Examples of acid binding agents are sodium acetate, sodium carbonate or sodium hydroxide or the corresponding lithium, potassium or ammonium compounds. Under the conditions given above, the addition generally occurs quickly and completely.

The chromium complex dyestuffs obtained by the process according to the invention are dark blue to black powders. They dissolve easily in hot water and are suitable, principally, for the dyeing of textiles. As such they are very valuable because of their dark shades and their good fastness properties. They are used, in particular, for the dyeing of materials containing natural polypeptide groups such as wool, silk and leather. The navy blue to grey blue wool dyeings have, in particular, very good fastness to light and rubbing and good fastness to milling, sea water and sulphur. Because, among other reasons, of their good water solubility and acid stability, the new chromium-containing azo dyestuffs can be used also for the printing of wool by the so-called Vigoureux printing process. Finally, they can also be used for the dyeing and printing of synthetic fibres such as, e.g. superpolyamide and superpolyurethane fibres as equally good wet fast dyeings are obtained on these synthetic fibres.

A particularly valuable class of dyestuffs according to the present invention corresponds to the formula

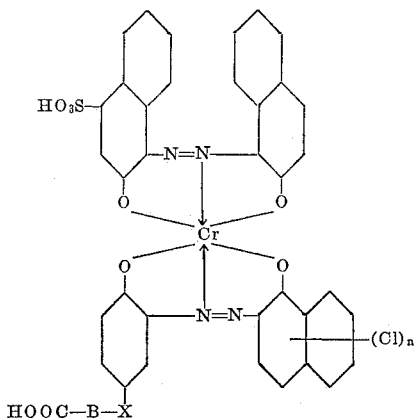

wherein

B represents a member selected from the group consisting of phenyl, chlorophenyl and naphthyl radicals, X represents a member selected from the group consisting of $SO_2$—NH—, —CO—NH— and —CO—, and $n$ is an integer from 1 to 3 inclusive.

Of these dyestuffs, as already mentioned above, those are particularly valuable wherein X is the bridging member —$SO_2$—NH— and the carboxyl group is in the o-position thereto.

The following examples serve only to illustrate the invention without limiting it in any way. Where not otherwise expressly stated, parts are given therein as parts by weight. The temperatures are in degrees centigrade.

EXAMPLE 1

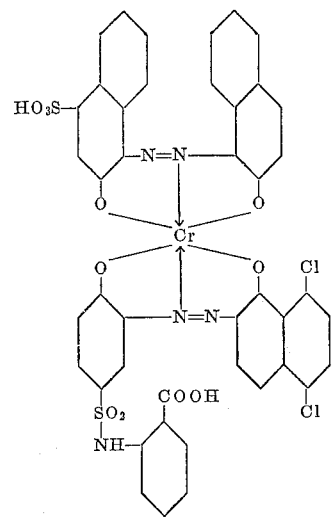

30 parts by volume of 2 N-caustic soda lye and 5.32 parts of the monoazo dyestuff obtained by coupling diazotised 2-amino-1-hydroxybenzene-4-sulphonic acid-(2'-carboxyphenyl)-amide with 5.8-dichloro-1-hydroxynaphthalene, are added to 150 parts of water. The complex chromium compound containing 1 chromium atom to 1 dyestuff molecule which corresponds to 0.52 part of chromium and 3.94 parts of the monoazo dyestuff from 1-diazo-2-hydroxynaphthalene-4-sulphonic acid and 2-hydroxynaphthalene, is added to the mixture. The mixture is heated at 90–95° until the starting materials have disappeared. The chromium-containing adduct is precipitated by the addition of sodium chloride, filtered off and dried. It is a dark powder which dyes wool from a weakly acid bath in fast navy blue shades.

Dyestuffs having similar properties are obtained if, instead of the monoazo dyestuff from diazotised 2-amino-1-hydroxybenzene-4-sulphonic acid-(2'-carboxyphenyl)-amide and 5.8-dichloro-1-hydroxynaphthalene, 5.32 parts of the monoazo dyestuff from diazotised 2-amino-1-hydroxybenzene-4-sulphonic acid-(3'-carboxyphenyl)-amide or 2-amino-1-hydroxy-4-sulphonic acid-(4'-carboxyphenyl)-amide and 5.8-dichloro-1-hydroxynaphthalene are used.

EXAMPLE 2

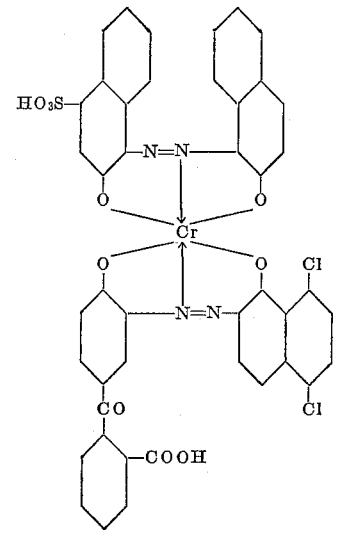

4.81 parts of the monoazo dyestuff from diazotised 4-hydroxy-3-amino-benzophenone-2'-carboxylic acid and 5.8-dichloro-1-hydroxynaphthalene, also 4.44 parts of the complex chromium compound containing 1 chromium atom to 1 dyestuff molecule which corresponds to 0.52 part of chromium and 3.94 parts of monoazo dyestuff from 1-diazo-2-hydroxynaphthalene-4-sulphonic acid and 2-hydroxynaphthalene, and 2.4 parts of sodium carbonate are suspended in 150 parts of water. The mixture is heated at 80–85° until the starting substances have disappeared. The new, chromium-containing dyestuff is precipitated by the addition of sodium chloride filtered off and dried. It is a dark powder which dyes wool from a weakly acid bath in navy blue shades. The dyeings have good fastness properties.

EXAMPLE 3

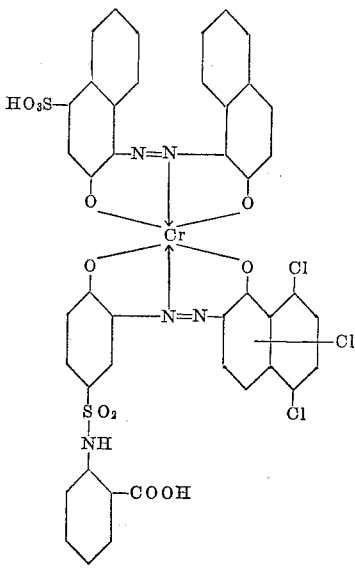

30 parts by volume of 2 N-caustic soda lye and 5.67 parts of the monoazo dyestuff obtained by coupling diazotised 2-amino-1-hydroxybenzene-4-sulphonic acid-(2'-carboxyphenyl)-amide with 5.8.x-trichloro-1-hydroxynaphthalene are added to 150 parts of water. The complex chromium compound containing 1 chromium atom to 1 dyestuff molecule which corresponds to 0.52 part of chromium and 3.94 parts of the monoazo dyestuff from 1-diazo-2-hydroxynaphthalene-4-sulphonic acid and 2-hydroxynaphthalene, is added to the mixture. The mixture is heated at 90–95° until the starting substances have disappeared. The chromium-containing addition product is precipitated by the addition of sodium chloride, filtered off and dried. It is a dark powder which dyes wool from a weakly acid bath in navy blue shades.

EXAMPLE 4

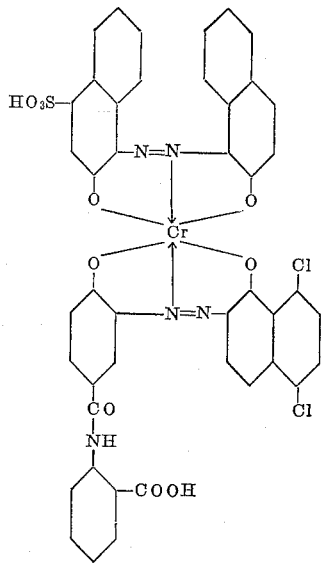

5.45 parts of crystallised sodium acetate and 4.96 parts of the monoazo dyestuff obtained by coupling diazotised 2-amino-1-hydroxybenzene-4-carboxylic acid-(2'-carboxyphenyl)-amide with 5.8-dichloro-1-hydroxynaphthalene are added to 150 parts of aqueous 50% ethanol. The complex chromium compound containing 1 chromium atom to 1 dyestuff molecule which corresponds to 0.52 part of chromium and 3.94 parts of the monoazo dyestuff from 1-diazo-2-hydroxynaphthalene-4-sulphonic acid and 2-hydroxynaphthalene is added. The mixture is heated at 60–65° until the starting substances have disappeared, the alcohol is removed by distillation and the chromium complex compound formed is salted out. After filtering off and drying, a dark powder is obtained which dyes wool from a weakly acid bath in blue shades.

Other dyestuff according to the invention having similar properties are obtained by the processes given in Examples 1–4 if the 1:1 chromium complex is produced from 0.52 part of chromium and the number of parts given of the monoazo dyestuff I in Table I and this is then reacted with the number of parts given of dyestuff II.

Table

| No. | Monoazo dyestuff I | Monoazo dyestuff II | Shade on wool |
|---|---|---|---|
| 1 | 1-diazo-2-hydroxy-naphthalene-4-sulphonic acid ——→2-hydroxy-naphthalene (3.94 parts). | 2-amino-1-hydroxybenzene-4-sulphonic acid-(2'-carboxy-5'-chlorophenyl)-amide——→5.8-dichloro-1-hydroxynaphthalene (5.67 parts). | navy blue. |
| 2 | ——do—— | 2-amino-1-hydroxybenzene-4-sulphonic acid-(2'-carboxy-5'-chlorophenyl)-amide——→5.8.x-trichloro-1-hydroxynaphthalene (6.01 parts). | Do. |
| 3 | ——do—— | 2-amino-1-hydroxybenzene-4-sulphonic acid-(2'-carboxyphenyl)-amide——→5-chloro-1-hydroxynaphthalene (4.98 parts). | Do. |
| 4 | ——do—— | 2-amino-1-hydroxybenzene-4-sulphonic acid-(2'-carboxy-5'-chlorophenyl)-amide——→5-chloro-1-hydroxynaphthalene (5.32 parts). | Do. |
| 5 | ——do—— | 2-amino-1-hydroxybenzene-4-sulphonic acid-(3'-carboxynaphthyl-(2))-amide——→5.8-dichloro-1-hydroxynaphthalene (5.82 parts). | Do. |
| 6 | ——do—— | 2-amino-1-hydroxybenzene-4-sulphonic acid-(3'-carboxynaphthyl-(2))-amide——→5.8.x-trichloro-1-hydroxynaphthalene (6.17 parts). | Do. |
| 7 | ——do—— | 2-amino-1-hydroxybenzene-4-sulphonic acid-(3'-carboxynaphthyl-(2))-amide——→5-chloro-1-hydroxynaphthalene (5.48 parts). | Do. |
| 8 | ——do—— | 2-amino-1-hydroxybenzene-4-sulphonic acid-(3'-carboxynaphthyl-(2))-amide——→4-chloro-1-hydroxynaphthalene (5.48 parts). | Do. |
| 9 | ——do—— | 2-amino-1-hydroxybenzene-4-carboxylic acid-(2'-carboxyphenyl)-amide——→5.8.x-trichloro-1-hydroxynaphthalene (5.31 parts). | Do. |
| 10 | ——do—— | 3-amino-4-hydroxybenzophenone-2'-carboxylic acid——→5.8.x-trichloro-1-hydroxynaphthalene (5.2 parts). | Do. |
| 11 | ——do—— | 3-amino-4-hydroxybenzophenone-2'-carboxylic acid——→5-chloro-1-hydroxynaphthalene (4.47 parts). | reddish navy blue. |

EXAMPLE 5

4 parts of the chromium-containing dyestuff produced according to example 1 are dissolved in 4000 parts of water and 100 parts of previously well wetted out wool are entered into the dyebath at 40–50°. 2 parts of 40% acetic acid are then added, the dye bath is brought to the boil within 30 minutes and is kept at boiling temperature for 45 minutes. The wool is then rinsed with cold water and dried. The navy blue wool dyeing has good fastness properties.

What we claim is:

1. The complex chromium compounds of the general formula

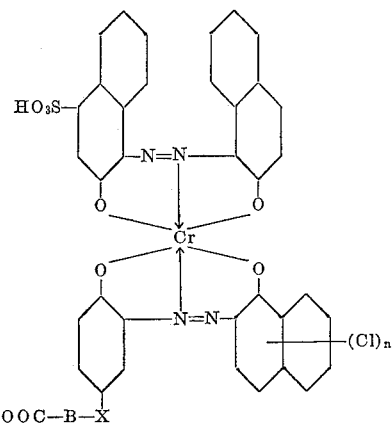

wherein

B represents a member selected from the group consisting of phenyl, chlorophenyl and naphthyl radicals, X represents a member selected from the group consisting of —SO$_2$NH—, —CONH— and —CO—, the —COOH group being ortho-positioned with respect to X, and B being phenyl when X is other than —SO$_2$NH, and n is an integer from 1 to 3 inclusive.

2. The complex chromium compound of the formula

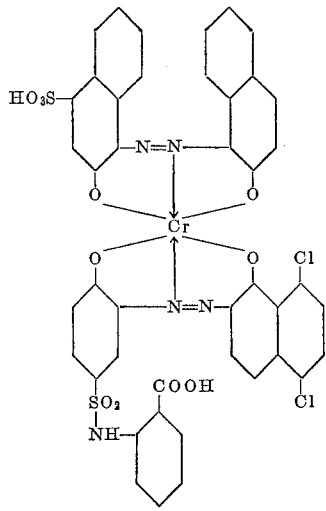

3. The complex chromium compound of the formula:

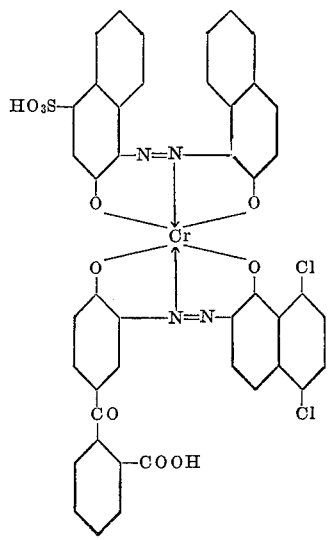

4. The complex chromium compound of the formula

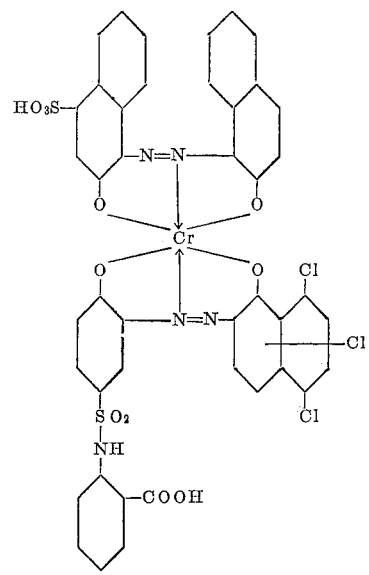

5. The complex chromium compound of the formula

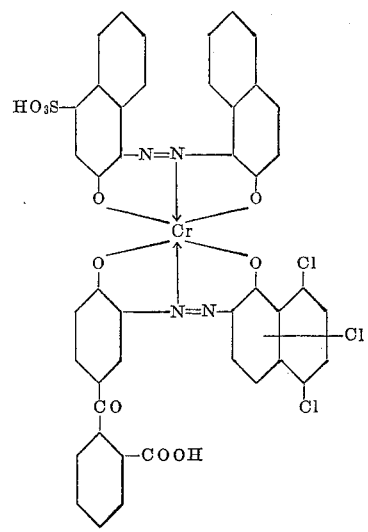

6. The complex chromium compound of the formula

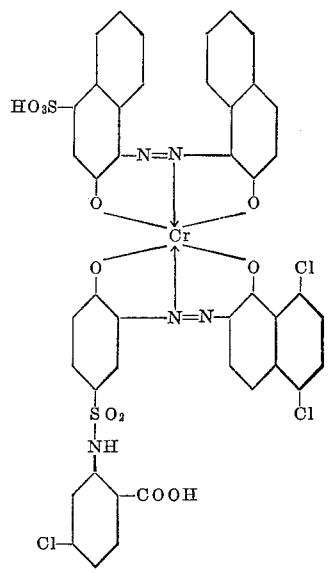

(References on following page)

References Cited in the file of this patent

UNITED STATES PATENTS

| | | |
|---|---|---|
| 2,756,223 | Schetty | July 24, 1956 |
| 2,806,760 | Brassel et al. | Sept. 17, 1957 |
| 2,933,488 | Biedermann et al. | Apr. 19, 1960 |

FOREIGN PATENTS

| | | |
|---|---|---|
| 934,905 | Germany | Nov. 10, 1955 |